(12) United States Patent
Yonezawa et al.

(10) Patent No.: US 9,082,010 B2
(45) Date of Patent: Jul. 14, 2015

(54) APPARATUS AND A METHOD FOR PROCESSING AN IMAGE OF PHOTORECEPTOR CELLS OF A FUNDUS OF AN EYE

(75) Inventors: Keiko Yonezawa, Kawasaki (JP); Kazuhide Miyata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 13/606,663

(22) Filed: Sep. 7, 2012

(65) Prior Publication Data
US 2013/0071004 A1   Mar. 21, 2013

(30) Foreign Application Priority Data
Sep. 20, 2011   (JP) .................................. 2011-204654

(51) Int. Cl.
*G06K 9/00*   (2006.01)
(52) U.S. Cl.
CPC .................................... *G06K 9/0061* (2013.01)
(58) Field of Classification Search
None
See application file for complete search history.

(56) References Cited

U.S. PATENT DOCUMENTS

| | | | |
|---|---|---|---|
| 2010/0195048 A1* | 8/2010 | Hammer et al. | 351/206 |
| 2011/0116044 A1* | 5/2011 | Nozato et al. | 351/206 |
| 2011/0234978 A1* | 9/2011 | Hammer et al. | 351/208 |

FOREIGN PATENT DOCUMENTS

JP   2008-293185 A   12/2008

OTHER PUBLICATIONS

Kaccie Y. Li and Austin Roorda, "Automated identification of cone photoreceptors in adaptive optics retinal images" J. Opt. Soc. Am. A, May 2007, vol. 24, No. 5, p. 1358-1363.
Scott B. Stevenson and Austin Roorda, "Correcting for miniature eye movements in high resolution scanning laser ophthalmoscopy" Proc. SPIE 5688, p. 145-150, 2005.

* cited by examiner

*Primary Examiner* — Bhavesh Mehta
*Assistant Examiner* — Siamak Harandi
(74) *Attorney, Agent, or Firm* — Canon U.S.A. Inc., IP Division

(57) ABSTRACT

An image processing apparatus for processing an image of photoreceptor cells of a fundus of an eye includes a conversion unit configured to convert the image of photoreceptor cells into an image indicating periodicity of the photoreceptor cells, and an acquisition unit configured to acquire intensity information in a plurality of directions of the image indicating the periodicity.

19 Claims, 11 Drawing Sheets

APPARATUS AND A METHOD FOR PROCESSING AN IMAGE OF PHOTORECEPTOR CELLS OF A FUNDUS OF AN EYE

BACKGROUND OF THE INVENTION

1. Field of the Invention

The present invention relates to an image processing apparatus and an image processing method for processing an image of a fundus of the eye.

2. Description of the Related Art

Examination of a fundus of a subject's eye is widely accepted as important in the early diagnosis of diseases which are likely to cause lifestyle-related diseases and blindness. A scanning laser ophthalmoscope (SLO), which is an ophthalmologic apparatus that uses the technique of confocal laser scanning microscopy, performs raster scanning of a fundus of the eye using laser as a measuring beam and promptly obtains high-resolution planar images from the intensity of the return beam. In recent years, an adaptive optics SLO including an adaptive optical system has been developed and is used for acquiring planar images of high lateral resolution. The adaptive optical system measures an aberration of a subject's eye by a wavefront sensor in real time and corrects the aberration of the measuring beam and the return beam that occurs at the subject's eye by a wavefront correcting device. Further, attempts are being made to extract a portion that corresponds to photoreceptor cells of a retina using the obtained planar image of retina and make a diagnosis of a disease or evaluate drug response by analyzing the density or distribution of the portion thereof.

An ophthalmologic imaging apparatus which visualizes the photoreceptor cells by acquiring a planar image of a retina using the adaptive optics SLO and automatically extracting a portion corresponding to the photoreceptor cells is discussed in Kaccie Y. Li and Austin Roorda, "Automated identification of cone photoreceptors in adaptive optics retinal images" J. Opt. Soc. Am. A, May 2007, Vol. 24, No. 5, 1358. This document discusses a technique for automated detection of the photoreceptor cells using an ophthalmologic imaging apparatus. According to this technique, a planar image of a retina with high lateral resolution is acquired by preprocessing the acquired planar image, in other words, removing high frequency components from the planar image using periodicity of the arrangement of the photoreceptor cells visualized in the image. Further, Voronoi analysis of the distribution of the photoreceptor cells is performed using the density of the photoreceptor cells and the distance between such cells measured from the result of the detection of the photoreceptor cells.

In order to accurately analyze the photoreceptor cells, it is important to use an image of high image quality. As one method for obtaining a high quality image, there is known a method that removes random noise by continuously capturing a plurality of images of the same portion and superimposing the captured images. Generally, before the superimposing processing is performed, an image that can be used as a reference (hereinafter referred to as a reference image) is selected from a plurality of images. Then, the superimposing processing is performed after each of the images is subjected to the alignment processing with respect to the reference image.

It is known that a random motion referred to as an involuntary eye movement is constantly seen with a subject's eye. Thus, even if imaging of the same portion is continuously performed, the imaging position is actually not fixed. Under such circumstances, Japanese Patent Application Laid-Open No. 2008-293185 discusses a method useful for accurately performing positional alignment of a plurality of tomographic images using a reference image.

The involuntary eye movement is categorized into movements such as tremor, flick, drift, and saccade. Tremor is a very small high frequency oscillation of a few µm, flick is a low frequency oscillation of a few 10 µm, drift is a constant flow movement, and saccade is an extremely fast movement.

In performing superimposing processing of images of a fundus of an eye, it is important not to select the reference image from images captured during a large magnitude of movement such as a flick, and to select a group of images captured during a tremor, which occurs between flicks. Thus, there is a need for easily determining the presence/absence of misregistration of the photoreceptor cell image of a fundus of an eye.

SUMMARY OF THE INVENTION

According to an aspect of the present invention, an image processing apparatus for processing an image of photoreceptor cells of a fundus of an eye includes a conversion unit configured to convert the image of photoreceptor cells into an image indicating periodicity of the photoreceptor cells, and an acquisition unit configured to acquire intensity information in a plurality of directions of the image indicating the periodicity.

According to an exemplary embodiment of the present invention, intensity information of an image (e.g., frequency image) indicating periodicity of photoreceptor cells of a fundus of the eye in a plurality of directions can be acquired, and the intensity information is displayed on a display unit such as a monitor. Thus, the presence/absence of misregistration of the image of the photoreceptor cells of a fundus of the eye can be easily determined.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An image processing apparatus according to an exemplary embodiment of the present invention includes a conversion unit configured to convert an image of photoreceptor cells of a fundus of a subject's eye into an image indicating periodicity in the photoreceptor cells. The conversion unit is, for example, a frequency conversion unit which acquires a frequency-converted frequency image of an image of photoreceptor cells of a fundus of a subject's eye. The frequency image is an example of an image of the photoreceptor cells indicating the periodicity thereof. The present embodiment can be applied to any method used for acquiring a periodic pattern of the photoreceptor cells. For example, an image indicating periodicity of the photoreceptor cells can be acquired by using the statistical feature of a texture. The statistical feature of a texture is a statistical nature considering the density distribution of a set of pixels. For example, the statistical feature can be obtained according to fractal analysis, calculation of run-length matrix, and calculation of co-occurrence matrix.

Further, the image processing apparatus according to the present embodiment includes an acquisition unit configured to acquire intensity information in a plurality of directions (e.g., XY directions) of the above-described image indicating periodicity. The intensity information is, for example, intensity distribution in each of the XY directions in FIGS. 5A and 5B or FIGS. 6A and 6B. Further, the intensity information is, for example, values indicating distortion of the ring structure (a feature quantity indicating distortion of the image and an index D). By using the intensity information, the presence/absence of misregistration of the photoreceptor cell images can be easily determined. In other words, images without misregistration can be selected as the images to be used for the superimposing processing.

The image processing apparatus can include a display control unit that causes a display unit such as a monitor to display a display form of the intensity information in a plurality of directions. According to such a display form displayed on the display unit, the user can easily determine the presence/absence of the misregistration of the image of the photoreceptor cells. The presence/absence of the misregistration can be displayed on the display unit. Further, the display form of the intensity information in a plurality of directions can be displayed on the display unit together with at least an image of the photoreceptor cells or a frequency image of the photoreceptor cells in association with the plurality of directions. By viewing the display unit, the user can easily determine whether the image has misregistration in either of the XY directions.

An adaptive optics SLO according to a first exemplary embodiment acquires a plurality of images of a fundus of a subject's eye by continuously imaging the same portion of a retina of the subject's eye. In performing the superimposing processing, it may be the case that images are used of the same portion and with low distortion regarding the involuntary eye movement of the subject's eye. By using such images, a high quality image can be obtained.

Further, in performing the superimposing processing, a reference image may be selected, which is used as a reference when the images are aligned, and a plurality of images to be superimposed. More specifically, a spatial frequency image corresponding to each of a plurality of planar images of the fundus of the eye (hereinafter referred to as planar images) is acquired by the adaptive optics SLO using the discrete Fourier transform. The acquired image is hereinafter referred to as a Fourier image. From the acquired Fourier image, a feature quantity that reflects the distortion in the image is acquired. Then, the reference image and a group of images to be used for the superimposing processing are selected based on the distribution of the feature quantity. By using the reference image and the images for the superimposing processing obtained in this manner, a high-quality image can be obtained from the superimposing processing.

Figure 3:
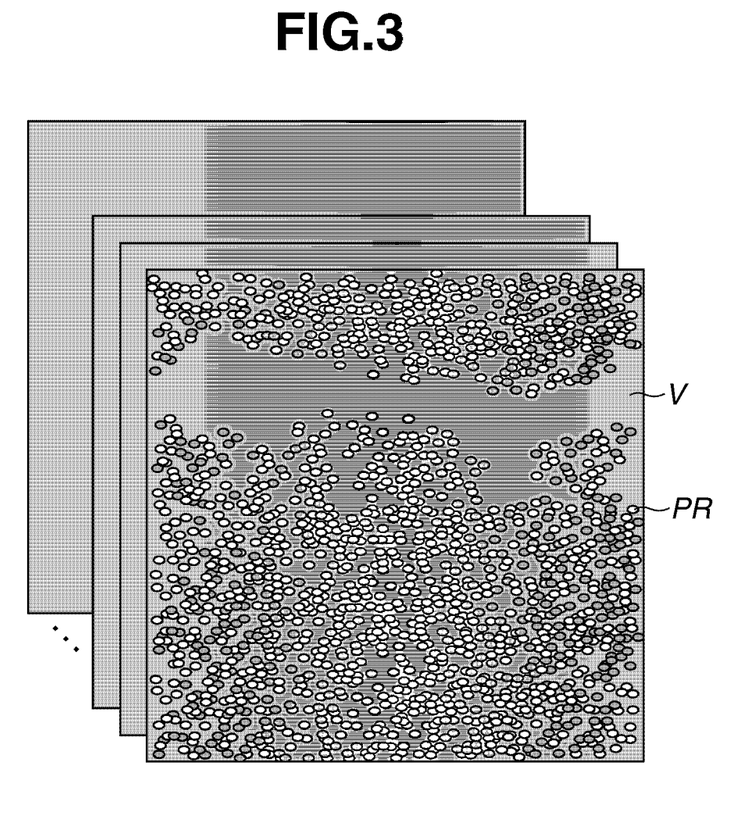
FIG. 3 is a schematic view of a high-precision planar image of photoreceptor cells captured by an adaptive optics SLO according to the first exemplary embodiment.

FIG. 3 schematically illustrates a planar image captured by the adaptive optics SLO. As illustrated in FIG. 3, a small region having relatively high luminance can be extracted in a distinguishable manner as a photoreceptor cell PR. Further, a blood vessel region V having low luminance compared to the luminance of the photoreceptor cell may be extracted. The blood vessel region V is the shadow of the blood vessel above the photoreceptor cells.

Figure 4A:
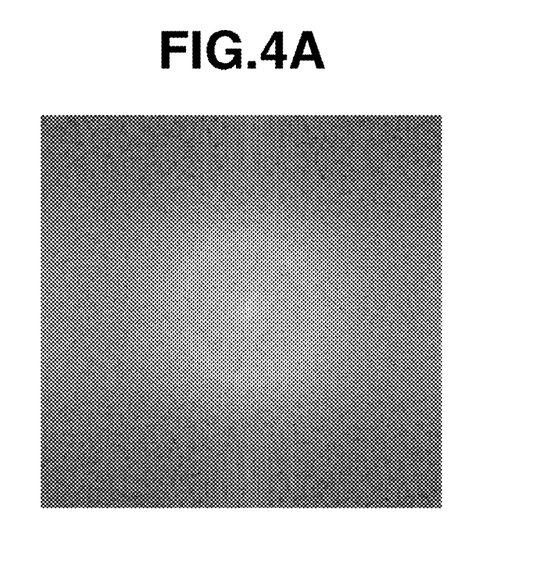
FIGS. 4A and 4B illustrate examples of a Fourier image obtained from frequency conversion of a planar image performed by the image processing apparatus according to the first exemplary embodiment.

FIG. 4A is an example of a Fourier image acquired by discrete Fourier transform of spatial frequency components of the planar images described above. As illustrated in FIG. 4A, a ring that corresponds to the periodicity of the photoreceptor cells is formed according to the periodic arrangement of the photoreceptor cells.

Figure 1:
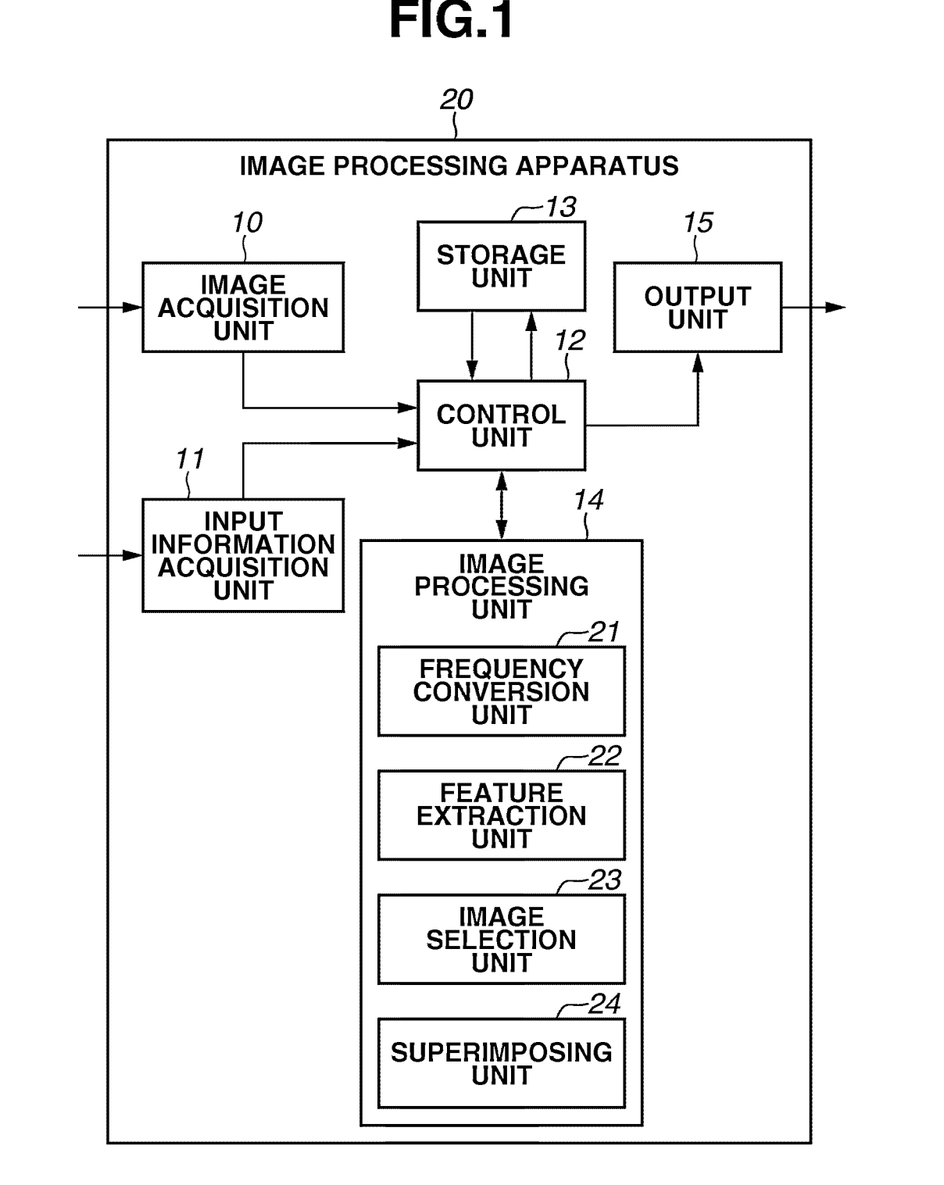
FIG. 1 is a block diagram illustrating an image processing apparatus according to a first exemplary embodiment of the present invention.

FIG. 1 illustrates a functional configuration of an image processing apparatus 20 according to the first exemplary embodiment.

The image processing apparatus 20 includes an image acquisition unit 10, an input information acquisition unit 11, and an image processing unit 14. The image acquisition unit 10 acquires a plurality of planar images from the adaptive optics SLO. These images are captured by the adaptive optics SLO according to imaging of the same portion of a retina. The input information acquisition unit 11 acquires information of the subject's eye whose planar images have been captured by the adaptive optics SLO. The acquired planar images are stored in a storage unit 13 via a control unit 12. The image processing unit 14 includes a frequency conversion unit 21, a feature extraction unit 22, an image selection unit 23, and a superimposing unit 24.

The image processing unit 14 generates a Fourier image from the acquired planar image and selects a reference image and a group of images to be used for the superimposing processing according to the feature quantity extracted from the Fourier image. The image processing unit 14 superimposes such images, and the generated image (hereinafter referred to as a superimposed image) is stored in the storage unit 13. An output unit 15 outputs the superimposed image to the monitor. The output unit 15 also outputs the result of the processing stored in the storage unit 13 to the database.

Although the image processing apparatus 20 acquires the planar images directly from the adaptive optics SLO in the present embodiment, the images can be acquired via the network. In such a case, a plurality of planar images captured by the adaptive optics SLO are stored in a database connected to the adaptive optics SLO via the network, and the image processing apparatus 20 acquires the images from the database via the network.

Figure 2:
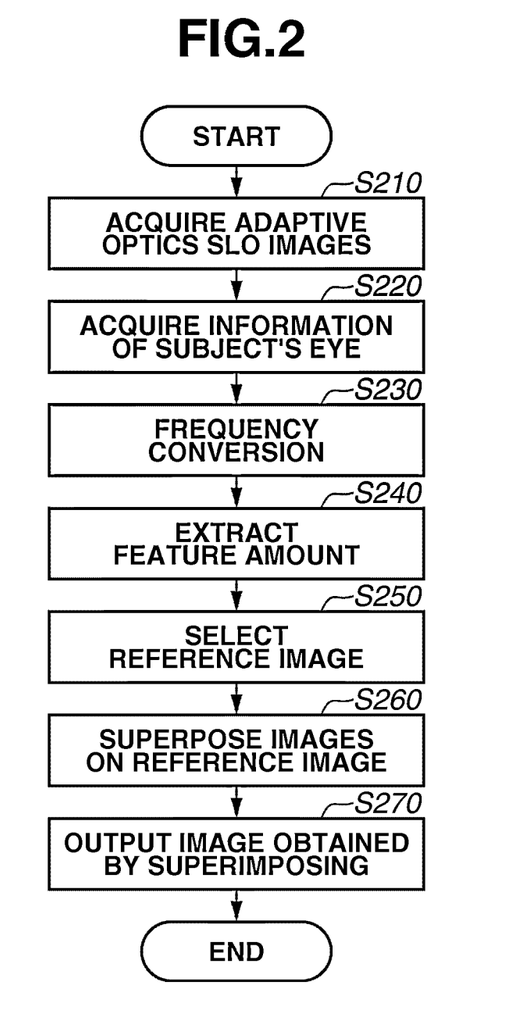
FIG. 2 is a flowchart illustrating image processing performed by the image processing apparatus according to the first exemplary embodiment.

Next, processing procedures of the image processing apparatus 20 according to the first exemplary embodiment will be described with reference to the flowchart of FIG. 2.

In step S210, the image acquisition unit 10 acquires a plurality of planar images to be analyzed from the adaptive optics SLO connected to the image processing apparatus 20 or a database where the planar images captured by the apparatus are stored. The acquired planar images are stored in the storage unit 13 via the control unit 12.

Further, the image acquisition unit 10 acquires imaging parameter information of the planar images when they are captured and stores the information in the storage unit 13 via the control unit 12. The imaging parameter information is, for example, position information of the fixation lamp when the imaging is performed. The imaging parameter information such as the position information of the fixation lamp may be included in an information file which is added to the planar images, but may also exist as tag information of the images.

In step S220, the input information acquisition unit 11 acquires information of the subject's eye from the database or from the input by the operator via an input unit (not illustrated). The information of the subject's eye is information of the patient (e.g., patient ID, name, age, and sex), whether the examination target is right/left eye, and shooting date and time. The acquired information is stored in the storage unit 13 via the control unit 12.

In step S230, the frequency conversion unit 21 acquires a spatial frequency image by discrete Fourier transform using each of the plurality of planar images acquired by the adaptive optics SLO and stored in the storage unit 13. As illustrated in FIG. 3, a greater part of each planar image is populated with regularly-arranged photoreceptor cells observed as small regions with high luminance. Thus, a Fourier image obtained from such a planar image by spatial frequency conversion has a ring structure as illustrated in FIG. 4A.

In step S240, the feature extraction unit 22 extracts feature quantity that indicates distortion of the image from the Fourier image acquired in step S230. Then, the acquired feature quantity is stored in the storage unit 13 via the control unit 12 in association with the acquired planar image. An example of the feature quantity acquired in step S240 is described below. The present invention, however, is not limited to the example described below.

Figure 4B:
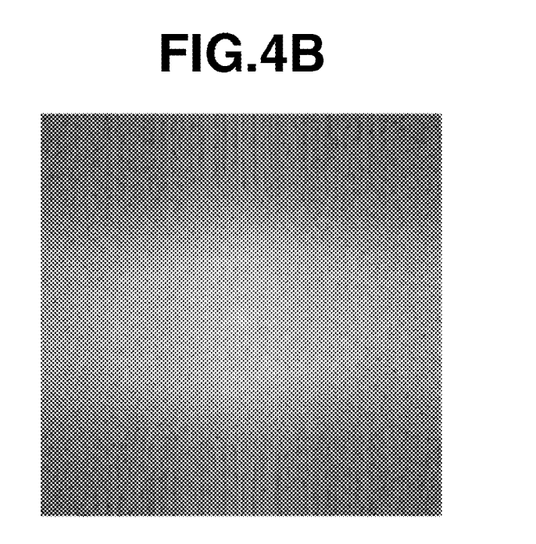

FIG. 4B illustrates a Fourier image of a planar image with distortion. In FIG. 4B, the ring structure, such as the one illustrated in FIG. 4A, is greatly distorted.

Figure 5A:
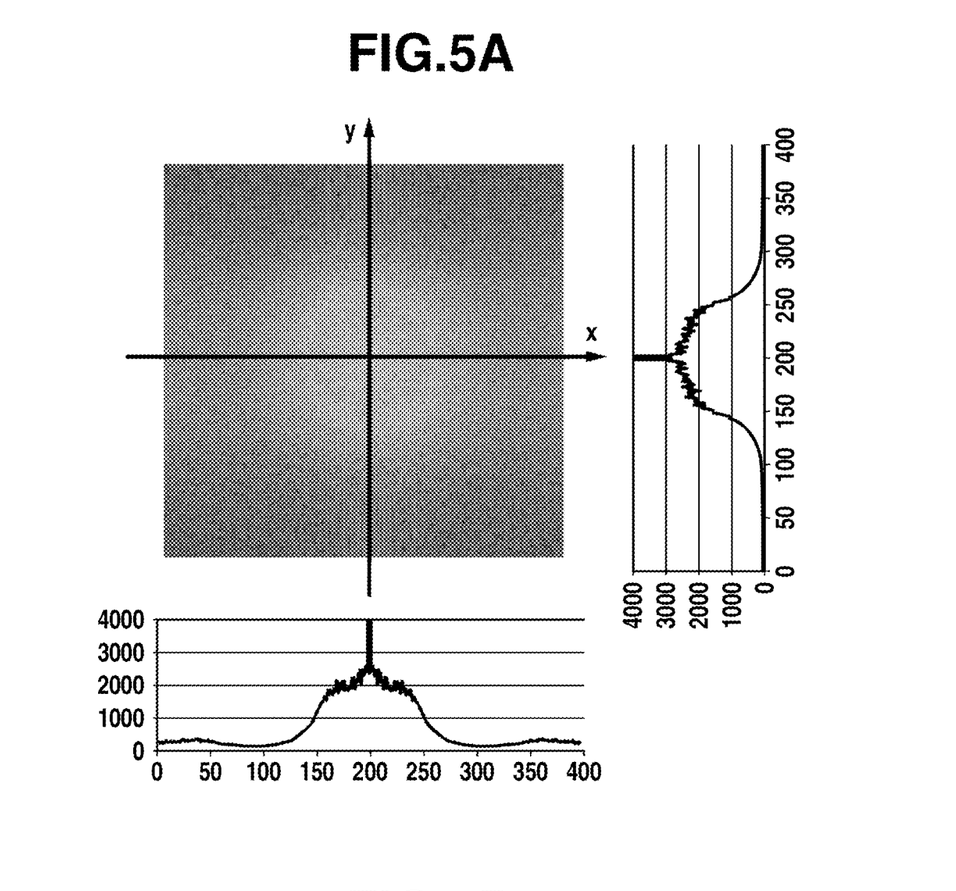
FIGS. 5A and 5B illustrate an example of extracting a feature quantity from a Fourier image corresponding to a planar image with low distortion by the image processing apparatus according to the first exemplary embodiment.

Thus, according to the present embodiment, a sum (integrated value) in the x direction (an example of a sum in a predetermined direction) and a sum in the y direction (an example of a sum in a direction perpendicular to the predetermined direction) of a Fourier image are considered as the feature quantities that indicate the distortion of the image. More specifically, as illustrated in FIG. 5A, a function Iysum(x) obtained by summing the Fourier image in the vertical direction and a function Ixsum(y) obtained by summing the Fourier image in the horizontal direction are considered where the size of the Fourier image is a square of N×N (N is the number of pixels).

$$I_{ysum}(x) = \sum_y I(x, y)$$

$$I_{xsum}(y) = \sum_x I(x, y)$$

I(x, y) is a luminance value of a pixel at a position (x, y) in the Fourier image. Thus, an index D as an index of the image distortion can be obtained from the difference between Iysum(x) and Ixsum(y).

$$D = \frac{|I_{ysum}(x) - I_{xsum}(y)|}{f_{average}}$$

The symbol "||" represents the absolute value, and "faverage" represents the average value of the luminance of the original planar image. Further, in the Fourier image, noise is increased at the values corresponding to x=0 and y=0 due to the edge. Thus, the values are removed when the above-described calculation is performed.

Figure 5B:
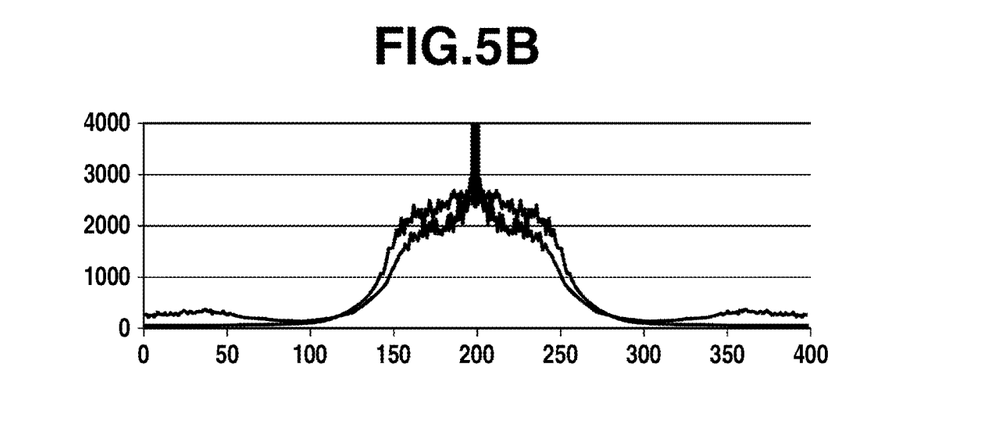
Figure 6A:
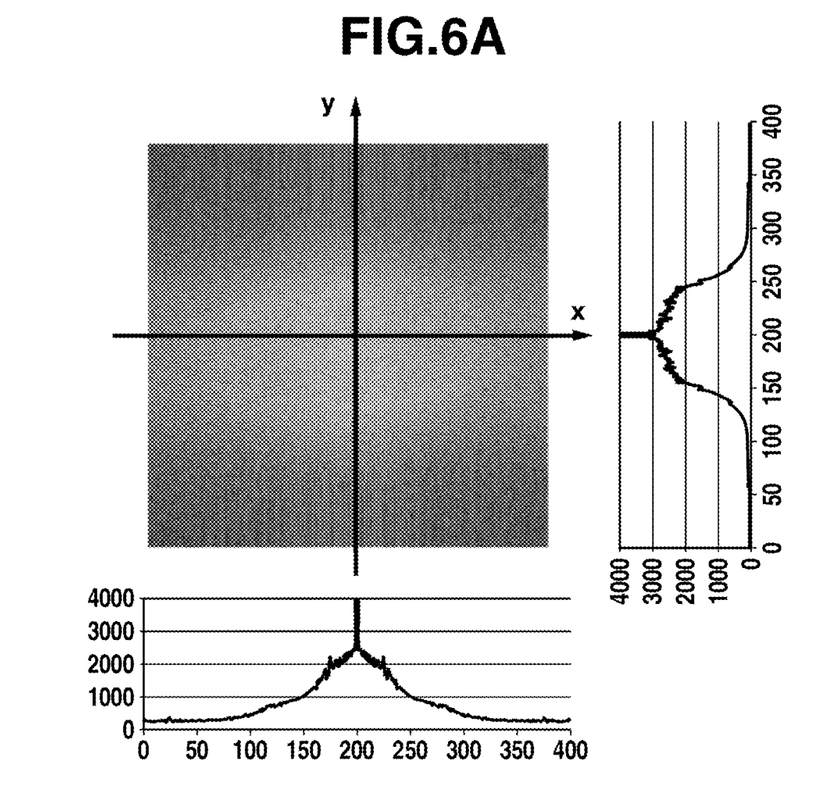
FIGS. 6A and 6B illustrate an example of extracting a feature quantity from a Fourier image corresponding to a planar image with high distortion by the image processing apparatus according to the first exemplary embodiment.
Figure 6B:
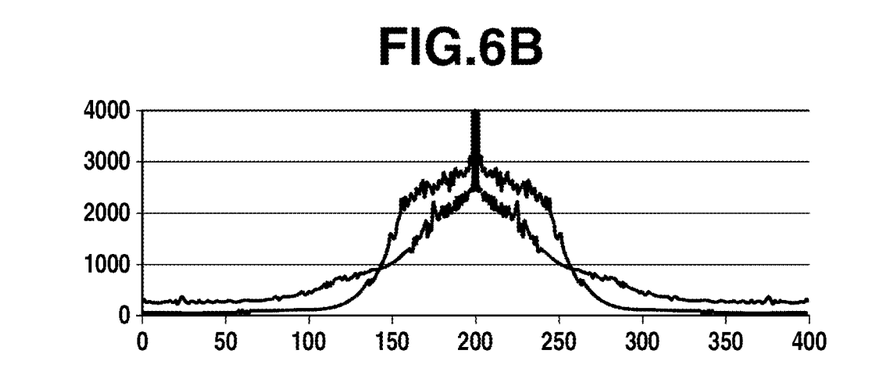

As illustrated in FIG. 5B, since a distortion-free Fourier image, such as the one illustrated in FIG. 4A, shows a circular ring structure, the values of Iysum(x) and Ixsum(y) are substantially the same. Accordingly, the index D will be a small value. On the other hand, as illustrated in FIGS. 6A and 6B, since a Fourier image corresponding to an image with distortion, such as the one illustrated in FIG. 4B, shows a distorted non-circular ring structure, the difference between the values of Iysum(x) and Ixsum(y) is great. Accordingly, the index D will be a large value.

In step S250, the image selection unit 23 selects a reference image which can be used as a reference in the imposition processing from the plurality of images of the same portion acquired by the adaptive optics SLO using the feature quantity acquired in step S240. Then, the selected reference image is stored in the storage unit 13 via the control unit 12.

In step S240, the index D is acquired as a feature quantity that indicates the image distortion. As a reference image, an image may be provided with a small value of the index D. Thus, an image with the smallest index D is selected as the reference image. Further, a different index of image quality can be used in selecting the reference image. For example, by using a mean value of contrast or luminance, candidates of the reference image can be selected. Then, images having a large index D can be removed from the candidate images.

More specifically, if a group of planar images including a number m of images is taken for the same portion, the index D described with reference to step S240 is obtained for each planar image and, further, the mean value and the dispersion of the group of planar images are acquired.

$$D_{average} = \sum_{i=1}^{m} D_m$$

$$\sigma_D^2 = \sum_{i=1}^{m} D_m^2 - D_{average}^2$$

Where an index indicating image quality of an image is $C_i$ with respect to each planar image, an image with the highest $C_i$ and, further, with $D_i$ equal to or smaller than a mean value of the index D+standard deviation will be selected as the reference image.

Further, the group of images to be superimposed on the selected reference image is selected based on the index D of each image. In other words, the images whose index D is equal to or smaller than the mean value of the index D+standard deviation are selected as the images suitable for the imposition processing.

In step S260, the superimposing unit 24 performs the positional alignment processing of the planar images with respect to the reference image selected in step S250. Then, the superimposing unit 24 obtains the superimposed image from the group of images which have undergone the positional alignment processing. The obtained image is stored in the storage unit 13 via the control unit 12.

There are many known methods for positional alignment used for aligning a plurality of images captured by imaging of the same portion. Regarding rigid body transformation that does not generate distortion of the image, there is known a method called phase-only correlation, which acquires only the movement direction. If some distortion is generated, the distortion can be corrected using affine transformation. If a great modification of the object is caused, various positional alignment methods for non-rigid body can be used. Further, the positional alignment is actively studied in the field of medical image processing. Similar to the present embodiment, as a method for positional alignment that focuses on distortion in association with involuntary eye movement of oculus, there is Scott B. Stevenson and Austin Roorda, "Correcting for miniature eye movements in high resolution scanning laser ophthalmoscopy" Proc. SPIE 5688, 145 (2005), where a positional alignment method of a retina image captured by adaptive optics SLO is discussed.

According to the first exemplary embodiment, after acquiring the movement direction of each planar image as a whole with respect to a reference image by the phase-only correlation method, the distortion is corrected by using the affine transformation. However, the position alignment of the present invention is not limited to such methods, and all the methods described above can be used.

The superimposed image is generated using the group of position-aligned images acquired as described above. If the size of the planar images of the group of the position-aligned images is M×L and the size of the planar images of the group of non position-aligned images is N×N, both M and L are greater than N. Since the size of the reference image does not change before and after the positional alignment processing, if the frame number of the reference image is "n", the n-th frame of the group of the position-aligned images will be an image having the size of N×N (the size of the reference image) among the images having the size of M×L, and the value of the pixels around the area will be 0.

The superimposed image is generated by obtaining values of other frames in the group of position-aligned images with respect to this region of N×N among the regions of M×L, and obtaining the mean value. In performing the superimposing processing, if the group of planar images includes imaging-failed frames due to, for example, blinking, or planar images with poor positional alignment, such images are excluded before the superimposing process. In this manner, a superimposed image with low noise level can be acquired.

In step S270, the control unit 12 displays the superimposed image, which has been stored in the storage unit 13 in step S260, on a monitor via the output unit 15. Further, the feature quantity and other data stored in the storage unit 13 in steps S210 to S260 are stored in the database.

According to the above-described configuration, a reference image suitable for the superimposing processing can be selected from a plurality of planar images obtained by imaging of the same position of a retina by the adaptive optics SLO. By selecting the reference image in such a manner, a superimposed image of good image quality can be acquired.

According to the first exemplary embodiment, as a method for acquiring an image of photoreceptor cells of a high image quality by the superimposing processing, a method for selecting an image with reduced distortion as a reference image from a plurality of planar images obtained by imaging of the same portion of a retina of a subject's eye has been described. However, it is known that involuntary eye movement of a fundus of the eye includes characteristic motions such as tremor, drift, flick, and saccade. For example, the imaging portion is greatly changed before and after the saccade. Thus, it is difficult to perform accurate positional alignment processing in such a case.

According to a second exemplary embodiment, the groups of planar images are classified according to the type of involuntary eye movement based on the feature quantity. According to this classification, the reference image can be selected from a group including many planar images with small variation that require comparatively simple positional alignment. Such images are captured, for example, during the tremor.

Thus, based on the feature quantity of the acquired group of planar images, the planar images are classified into a plurality of groups corresponding to small motions such as the tremor. Further, the reference image and the images used for the superimposing are selected based on the classification.

Figure 7:
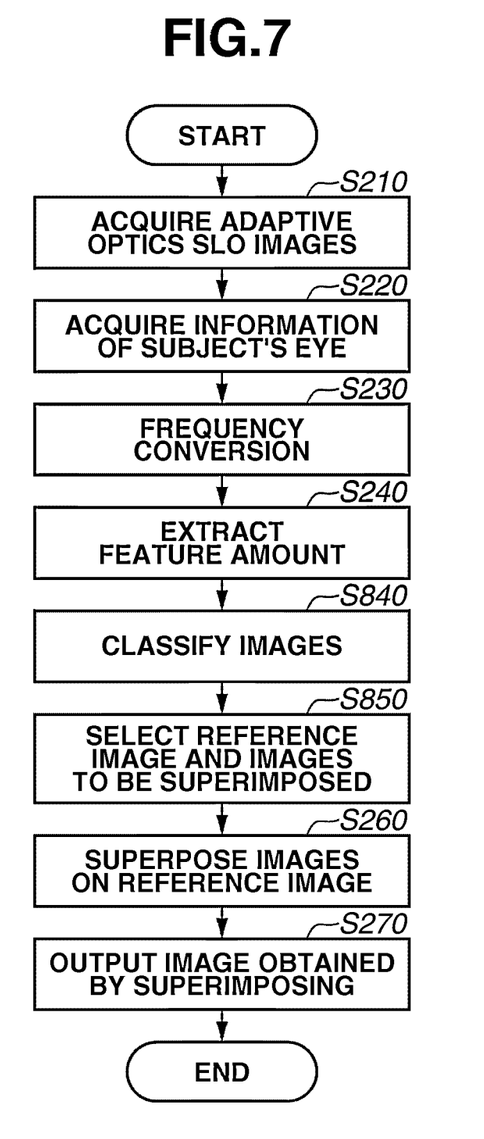
FIG. 7 is a flowchart illustrating image processing performed by an image processing apparatus according to a second exemplary embodiment of the present invention.

The processing procedure of the image processing apparatus 20 according to the second exemplary embodiment will be described with reference to the flowchart of FIG. 7. Since the processing in steps S210, S220, S230, S240, S260, and S270 is similar to the processing procedures described with reference to the first exemplary embodiment, the descriptions thereof are not repeated.

According to the first exemplary embodiment, a reference image is selected by extracting a feature quantity that reflects the image distortion from the planar images of each group acquired by the adaptive optics SLO, and comparing the acquired feature quantities. According to the second exemplary embodiment, a reference image and planar images which can generate the best superimposed image are selected while considering the motions unique to the eye, which is performed by classifying the entire groups of planar images based on the feature quantity.

The steps in FIG. 7 will now be described in detail.

In step S840, an image classification unit (not illustrated) included in the image processing unit 14 classifies a plurality of planar images of the same portion of the fundus of the eye captured by the adaptive optics SLO based on the feature quantity that designates the distortion of the image acquired in step S240. The result of the classification is stored in the storage unit 13 via the control unit 12.

Figure 8:
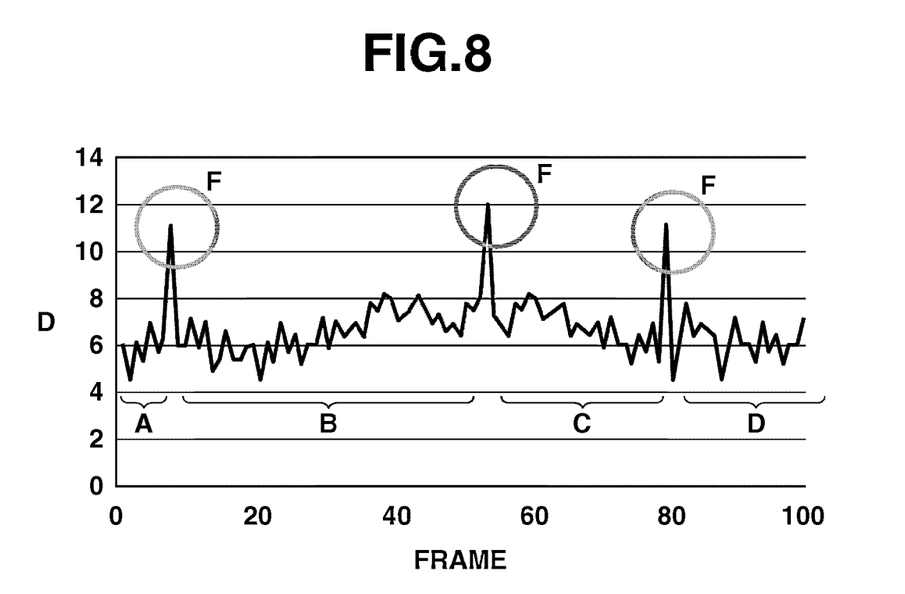
FIG. 8 is a chart illustrating a group of planar images which are classified according to types of involuntary eye movement of the subject's eye based on the feature quantity by the image processing apparatus according to the second exemplary embodiment.

The involuntary eye movement includes a combination of a small motion of a few μm called a tremor (T) and a comparatively larger motion of a few 10 μm called flick (F). Although great distortion is not included in the planar images captured during tremor (T), significant distortion may be included in the planar images captured during the flick (F). Thus, the changes in the feature quantity extracted in step S240 may be as illustrated in FIG. 8.

Generally, the feature quantity D regarding distortion of an image corresponding to flick (F) is increased but the feature quantity D regarding distortion of an image corresponding to tremor (T) is decreased. Thus, as illustrated in FIG. 8, the planar images in a group are classified based on the feature quantity obtained in step S240. When the planar images are classified, the planar image corresponding to the flick is used as a boundary image. More specifically, regarding the mean value and the dispersion of the feature quantity D obtained in step S240, the feature quantity D having a value greater than $3\sigma$ is considered as corresponding to the flick and set as the classification boundary.

In step S850, the image selection unit 23 in the image processing unit 14 selects the reference image and the group of planar images to be used for the superimposing processing which have been acquired based on the classification performed in step S840. Then, the selected reference image and the planar images to be used for the superimposing processing are stored in the storage unit 13 via the control unit 12.

In order to obtain a superimposed image of high image quality, it is useful to obtain many images of the same portion. Regarding the classification (groups A to D) in step S840, since the planar images of the same group can be considered as a group of planar images with low distortion acquired by imaging of the same position, the number of frames included in each group is important. Further, although the images in each of the groups A to D are classified as images of different groups, since the imaging portion may be similar, the distance between each group is calculated. More specifically, a planar image positioned at the center of each group in terms of imaging time is selected for each group, and the distance between the planar images is obtained using the phase-only correlation method.

If the obtained distance is approximately 15% or less of the image size, that is, if the overlapping image region is 80% or more of the image region, the two groups are considered as the same group. Regarding the case in FIG. 8, groups A and D are classified as the same group.

Next, a group including the largest number of planar images is selected. The group of planar images to be used for the superimposing processing will be the planar images included in the selected group. Further, the reference image is selected from such planar images. As is the reference image selected in step S250, the planar image with the smallest feature quantity D may be selected as the reference image. Further, the reference image may be selected based on a different feature quantity such as contrast.

Figure 9:
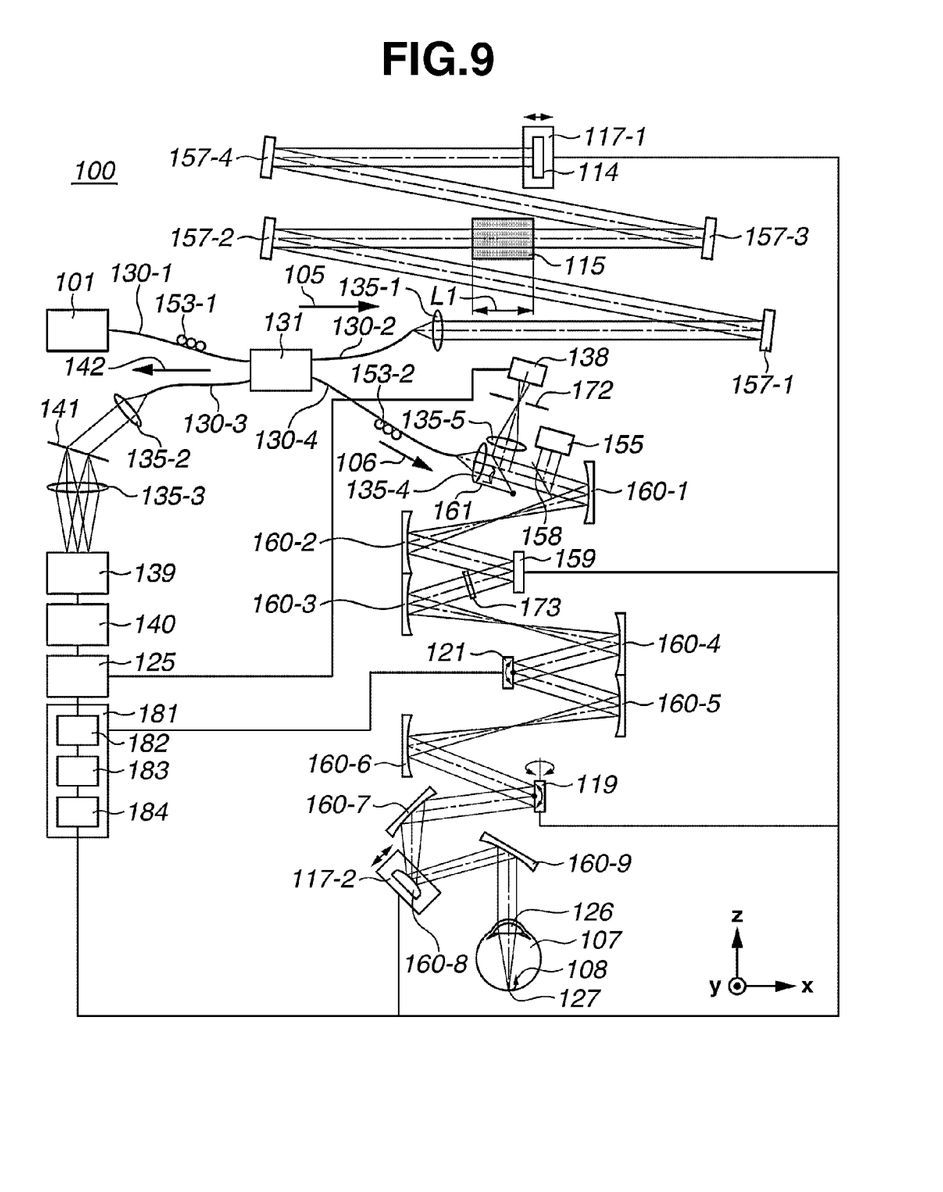
FIG. 9 illustrates an overall configuration of a composite apparatus as an example of the adaptive optics SLO according to a third exemplary embodiment of the present invention.

As an example of the adaptive optics SLO according to a third exemplary embodiment, a composite apparatus composed of an SLO apparatus and an optical coherence tomography (OCT) apparatus will be described with reference to FIG. 9. According to this apparatus, planar images (SLO images) of high lateral resolution as well as tomographic images (OCT images) can be captured for a retina. The SLO apparatus can capture an aberration-corrected planar image by using a spatial light modulator that corrects the aberration that occurs at the anterior section of the subject's eye. Further, the OCT apparatus employs Fourier domain imaging, and can capture an aberration-corrected tomographic image of the aberration that occurs at the anterior section of the subject's eye.

First, an overall configuration of the composite apparatus 100 according to the third exemplary embodiment will be described in detail with reference to FIG. 9. Light emitted from a light source 101 is divided into a reference beam 105 and a measuring beam 106 by an optical coupler 131. The measuring beam 106 is guided to a subject's eye 107 as an object to be observed via a single mode fiber 130-4, a spatial light modulator 159, an XY scanner 119, an X scanner 121, and spherical mirrors 160-1 to 160-9.

The measuring beam 106 is reflected or scattered by the subject's eye 107 being an object to be observed and returned as a return beam 108. The return beam 108 enters a detector 138 or a line sensor 139. The detector 138 converts the light intensity of the return beam 108 into a voltage signal. Then, based on the voltage signal, a planar image of the subject's eye 107 is generated. Further, the return beam 108 is combined with the reference beam 105, and the combined light is caused to enter the line sensor 139. Accordingly, a tomographic image of the subject's eye 107 is formed. Furthermore, by using a plurality of acquired tomographic images, a three-dimensional course of blood vessels can be extracted. Although a spatial light modulator is used as a device for correcting the wavefront aberration, in the present embodiment, any device can be used so long as the wavefront aberration can be corrected. Thus, for example, a variable shape mirror can be used.

Next, the periphery of the light source 101 will be described. The light source 101 uses a super luminescent diode (SLD) being a typical low-coherent light source. The central wavelength and the bandwidth are 830 nm and 50 nm, respectively. In order to acquire a planar image with small speckle noise, a low-coherent light source is selected. Although the SLD is selected as a type of the light source, a different light source can be used so long as low coherent light can be emitted. For example, an amplified spontaneous emission light source can be used. Further, near-infrared light is suitable as a wavelength from the viewpoint of measurement of eyes. Further, since the wavelength affects the lateral resolution of the acquired planar image, in one case a shorter wavelength is provided. In the descriptions below, a wavelength of 830 nm is used. Other wavelengths may be selected depending on the measuring portion of the object to be observed.

Light emitted from the light source 101 is divided into the reference beam 105 and the measuring beam 106 at a ratio of 96:4 via a single mode fiber 130-1 and the optical coupler 131. The composite apparatus 100 further includes polarization controllers 153-1 and 153-2.

Next, an optical path of the reference beam 105 will be described. The reference beam 105 divided by the optical coupler 131 is adjusted so that it is guided to a lens 135-1 via a single mode fiber 130-2 and adjusted so as to become parallel light with a beam diameter of 4 mm.

Next, the reference beam 105 is guided to a mirror 114 being a reference mirror by mirrors 157-1 to 157-4. Since the optical path length of the reference beam 105 is adjusted to be substantially the same as that of the measuring beam 106, the reference beam 105 and the measuring beam 106 interfere with each other. Next, the reference beam 105 is reflected by the mirror 114 and guided again to the optical coupler 131. A dispersion compensation glass 115, through which the reference beam 105 passes, compensates the dispersion that occurs when the measuring beam 106 travels to the subject's eye 107 and returns from the subject's eye 107 with respect to the reference beam 105. In the following descriptions, for example, an average diameter of an oculus of a Japanese being L1=23 mm is used.

A motorized stage 117-1 is movable in the directions indicated by an arrow to allow the optical path length of the reference beam 105 to be adjusted and controlled. Further, the motorized stage 117-1 is driven by a motorized stage driver 183 in a driver unit 181 under the control of a personal computer 125.

Next, the optical path of the measuring beam 106 will be described. The measuring beam 106 split by the optical coupler 131 is guided to a lens 135-4 via the single mode fiber 130-4 and adjusted so as to become parallel light with a beam diameter of 4 mm. Further, the polarization controller 153-1 or 153-2 can adjust the polarization state of the measuring beam 106. In the present embodiment, the polarization controller 153-1 or 153-2 adjusts the polarization state of the measuring beam 106 to be linearly polarized in a direction parallel to the drawing surface of FIG. 9.

The measuring beam 106 passes through a beam splitter 158 and a movable beam splitter 161 (also referred to as a splitting unit) and reaches the spatial light modulator 159 via the spherical mirrors 160-1 and 160-2. Then, the measuring beam 106 is modulated by the spatial light modulator 159. In the present embodiment, the spatial light modulator 159 utilizes the orientation characteristics of the liquid crystal. More specifically, the spatial optical modulator 159 is arranged in a direction where the spatial optical modulator 159 can modulate the phase of linear polarization parallel to the drawing surface of FIG. 9 (i.e., the P polarization) to coincide with the polarization orientation of the measuring beam 106.

Further, the measuring beam 106 passes through a polarizing plate 173 and reaches a mirror of the X scanner 121 via the spherical mirrors 160-3 and 160-4. In the present embodiment, the polarizing plate 173 has a role to guide only the linear polarization parallel to the drawing surface of FIG. 9, of the return beams 108, to the spatial light modulator 159. Further, in the present embodiment, the X scanner 121 scans the measuring beam 106 in a direction parallel to the drawing surface of FIG. 9. For example, the X scanner 121 is a resonant scanner having a drive frequency of approximately 7.9 kHz.

Further, the measuring beam 106 is incident on a mirror of the XY scanner 119 via the spherical mirrors 160-5 and 160-6. Although the number of the mirrors in the XY scanner 119 is illustrated as one, actually, the XY scanner 119 includes two mirrors (X-scanning mirror and Y-scanning mirror) arranged close to each other. Further, the measuring beam 106 is adjusted in such a manner that its center coincides with the center of rotation of the mirror of the XY scanner 119. The drive frequency of the XY scanner 119 is changeable in the range up to 500 Hz. The spherical mirrors 160-7 to 160-9 are optical systems that cause the measuring beam 103 to scan a retina 127. Having a point near a cornea 126 as a support point, the measuring beam 106 scans the retina 127.

Although the measuring beam 106 has a beam diameter of 4 mm, the beam diameter may be increased for acquisition of a high resolution tomographic image. A motorized stage 117-2 is configured to move in a direction indicated by an arrow in FIG. 9 and to adjust and control the position of a spherical mirror 160-8 attached thereto. Similarly to the motorized stage 117-1, the motorized stage 117-2 is controlled by the motorized stage driver 183. By adjusting the position of the spherical mirror 160-8, it is possible to focus the measuring beam 106 on a predetermined layer of the retina 127 of the subject's eye 107 and observe the subject's eye 107. In the initial state, the position of the spherical mirror 160-8 is adjusted so that the measuring beam 106 can enter the cornea 126 as parallel light.

The composite apparatus 100 according to the present embodiment can cope with the subject's eye 107 having a refractive error. When the measuring beam 106 enters the subject's eye 107, the measuring beam 106 becomes the return beam 108 due to reflection or scattering from the retina 127. Then, the return beam 108 reaches the line sensor 139 by being guided again by the optical coupler 131. A part of the return beam 108 is reflected by the movable beam splitter 161 and guided to the detector 138 via a lens 135-5.

A light blocking plate 172 having a pinhole has a function of blocking unnecessary light not focused on the retina 127 among the return beams 108. Further, the light blocking plate 172 is arranged in a position conjugate with the focusing position of the lens 135-5. The diameter of the pinhole of the light blocking plate 172 is, for example, 50 μm. As the detector 138, for example, an avalanche photodiode (APD), which is a high-speed, highly-sensitive light sensor, is used. A part of the return beam 108 split by the beam splitter 158 enters a wavefront sensor 155. The wavefront sensor 155 is a Shack-Hartmann (or Hartmann-Shack) wavefront sensor.

The spherical mirrors 160-1 to 160-9 are arranged so that they are optically conjugate with the XY scanner 119, the X scanner 121, the cornea 126, the wavefront sensor 155, and the spatial light modulator 159. Thus, the wavefront sensor 155 can measure the aberration of the subject's eye 107. Further, the spatial light modulator 159 can correct the aberration of the subject's eye 107. Furthermore, by controlling the spatial light modulator 159 in real time based on the obtained aberration, it is possible to correct the aberration that occurs in the subject's eye 107 and to acquire tomographic images with higher lateral resolution.

Next, the configuration of the measurement system will be described. The composite apparatus 100 can acquire tomographic images (OCT images) as well as planar images (SLO images).

First, the measurement system for the tomographic images will be described. The return beam 108 are combined by the optical coupler 131. The combined light (combined light 142) is guided to a transmissive grating 141 via a single mode fiber 130-3 and a lens 135-2, and is dispersed for each wavelength. Then, the light enters the line sensor 139 via a lens 135-3. The line sensor 139 converts the light intensity for each position (wavelength) into a voltage signal. The voltage signal is converted into a digital value by a frame grabber 140 so that tomographic images of the subject's eye 107 are constructed in the personal computer 125. The line sensor 139 includes 1024 pixels and can obtain the intensity of the combined light 142 for each wavelength (a division of 1024).

Next, the measurement system for the planar images will be described. A part of the return beam 108 is reflected by the movable beam splitter 161. After unnecessary light is blocked by the light blocking plate 172, the reflected light reaches the detector 138, and the light intensity is converted into an electric signal. Data of the obtained electric signal is processed by the personal computer 125 in synchronization with the scanning signal of the X scanner 121 and the XY scanner 119. Accordingly, a planar image is formed.

A part of the return beam 108 split by the beam splitter 158 enters the wavefront sensor 155, and the aberration of the return beam 108 is measured. An image signal obtained by the wavefront sensor 155 is supplied to the personal computer 125, and the aberration is calculated. The obtained aberration is expressed by Zernike polynomial, which represents the aberration of the subject's eye 107. The Zernike polynomial includes a tilt term, a defocus term, an astigmatism term, a coma term, and a trefoil term.

Next, an acquisition method for tomographic images (OCT images) using the composite apparatus 100 will be described with reference to FIGS. 10A, 10B, and 10C. The composite apparatus 100 acquires a tomographic image of the retina 127 by controlling the XY scanner 119 and acquiring an interference fringe by the line sensor 139 using the X scanner 121 as a fixed mirror. The movable beam splitter 161 is controlled so that the return beams 108 are not guided to the detector 138.

Further, the X scanner 121 and the XY scanner 119 are controlled by an optical scanner driver 182 in the driver unit 181 from the personal computer 125. In the present embodiment, the method for acquiring a tomographic image (a plane parallel to the optical axis) of the retina 127 will be described.

Figure 10A:
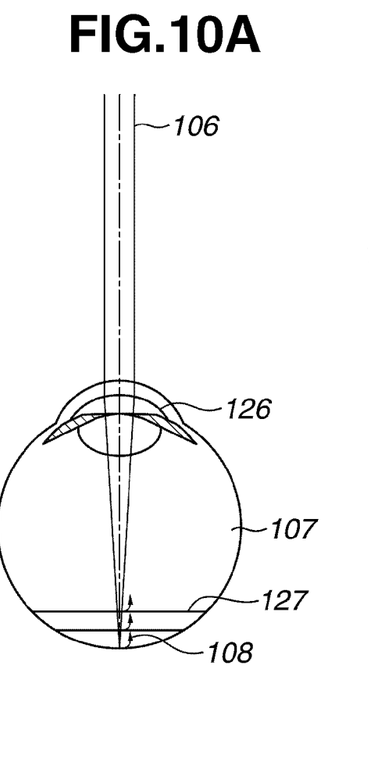
FIGS. 10A, 10B, and 10C illustrate a method for acquiring a tomographic image by the composite apparatus as an example of the adaptive optics SLO according to the third exemplary embodiment.
Figure 10B:
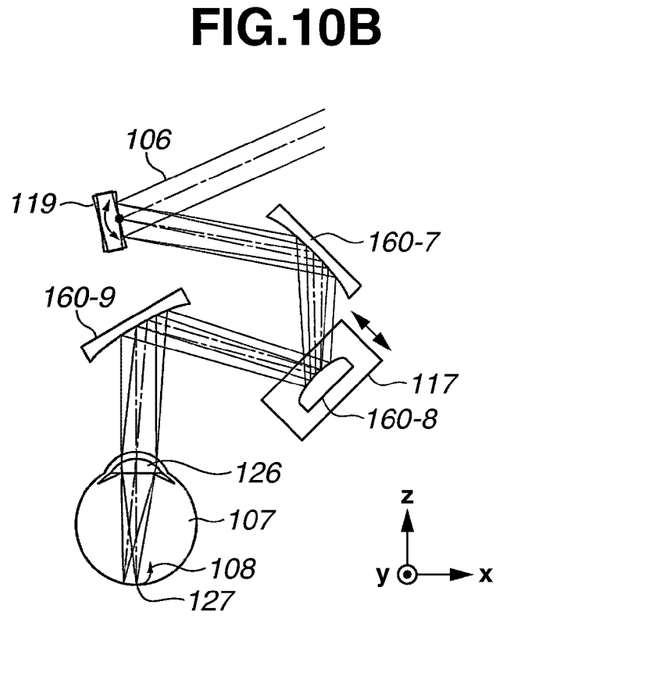
Figure 10C:
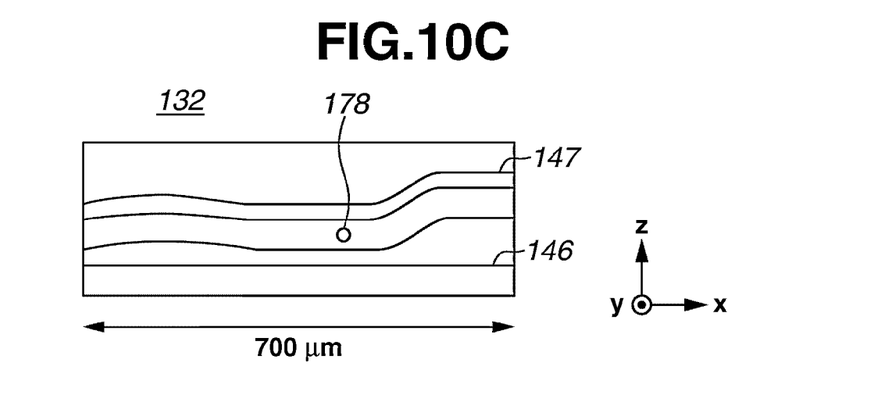

FIG. 10A is a schematic view of the subject's eye 107 and illustrates a state where the subject's eye 107 is observed by the composite apparatus 100. As illustrated in FIG. 10A, when the measuring beam 106 enters the retina 127 via the cornea 126, the measuring beam 106 becomes the return beam 108 due to reflection or scattering at various positions. Then, the return beam 108 reaches the line sensor 139 with delays at the respective positions. Since the light source 101 has a large bandwidth and a short coherence length, the line sensor 139 can detect an interference fringe when the optical path length of the reference beam path is approximately equal to the optical path length of the measuring beam path. As described above, the interference fringe acquired by the line sensor 139 is an interference fringe in a spectrum region on the wavelength axis.

Subsequently, the interference fringe, which is information of the wavelength axis, is converted into an interference fringe on an optical frequency axis considering the characteristics of the line sensor 139 and the transmissive grating 141. Further, by performing inverse Fourier transform of the obtained interference fringe on the optical frequency axis, it is possible to obtain information in the depth direction. As illustrated in FIG. 10B, if the interference fringe is detected while the XY scanner 119 is driven, the interference fringe can be obtained at each position on the X-axis. More specifically, the information in the depth direction can be obtained at each position on the X-axis. As a result, a two-dimensional distribution of the intensity of the return beam 108 on the XZ plane is obtained, which is a tomographic image 132 (see FIG. 10C).

As described above, the tomographic image 132 is an image obtained by arranging the intensity of each of the return beams 108 in an array. For example, the tomographic image 132 is a gray scale intensity image. The length of the tomographic image 132 in the X direction is 700 μm, which is similar to the SLO image described below. In FIG. 10C, only the boundaries in the obtained tomographic image are expressed in lines. The illustration includes a retinal pigment epithelial layer 146, a stratum opticum 147, and a blood vessel 178. Further, if a plurality of tomographic images is acquired at each position on the Y-axis, it is possible to visualize a three-dimensional course of the blood vessel.

Next, an acquisition method of a planar image (SLO image) using the composite apparatus 100 will be described with reference to FIGS. 11A, 11B, 11C, and 11D. The composite apparatus 100 can acquire a planar image of the retina 127 by controlling and operating the XY scanner 119 in only the Y-axis direction and the X scanner 121 while fixing the X-axis direction of the XY scanner 119, and acquiring the intensity of the return beam 108 using the detector 138.

The X scanner 121 and the XY scanner 119 are controlled by the optical scanner driver 182 in the driver unit 181 from the personal computer 125. Further, the composite apparatus 100 can acquire a planar image while correcting the aberration that occurs at the subject's eye 107 by controlling the spatial light modulator 159. The spatial light modulator 159 can be controlled by using the aberration of the subject's eye 107 measured by the wavefront sensor 155. Further, the composite apparatus 100 can acquire a planar image while controlling the spatial light modulator 159 in real time.

Figure 11A:
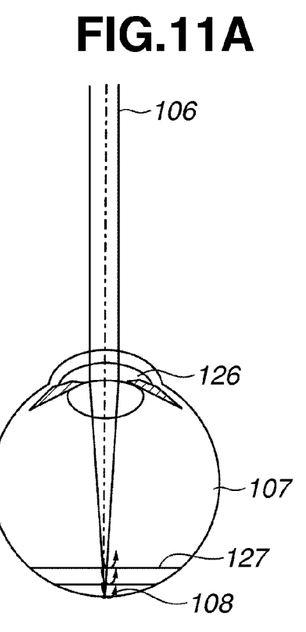
FIGS. 11A, 11B, 11C, and 11D illustrate a method for acquiring a planar image by the composite apparatus as an example of the adaptive optics SLO according to the third exemplary embodiment.
Figure 11B:
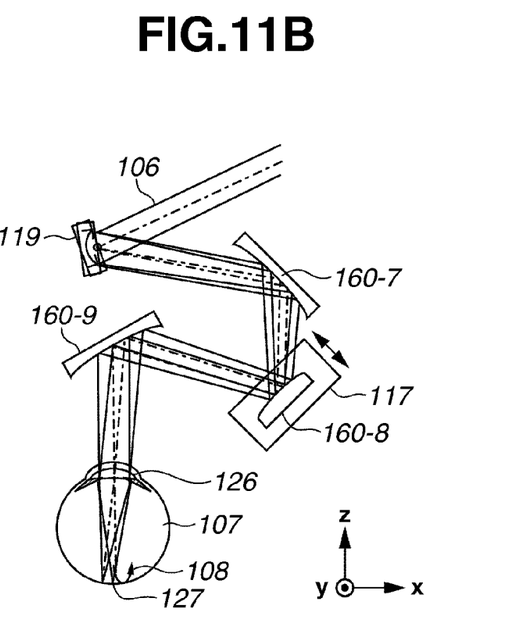

FIG. 11A is a schematic view of the subject's eye 107 and illustrates a state where the subject's eye 107 is observed by the composite apparatus 100. As illustrated in FIG. 11A, when the measuring beam 106 enters the retina 127 via the cornea 126, the measuring beam 106 becomes the return beam 108 due to reflection or scattering at various positions. Then, the return beam 108 reaches the detector 138. Further, as illustrated in FIG. 11B, if the intensity of the return beam 108 is detected while the XY scanner 109 is moved in the X direction, information at each position on the X-axis can be obtained.

Figure 11C:
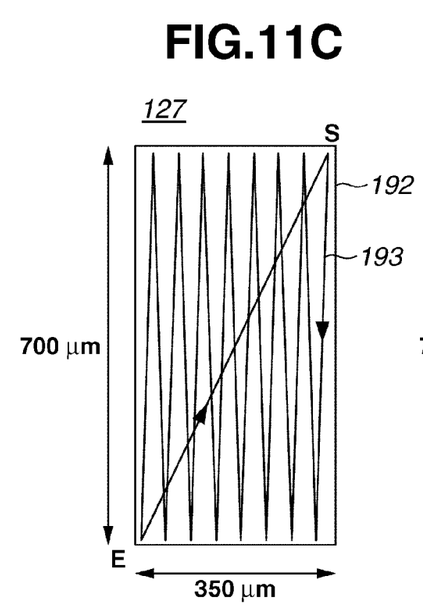

As illustrated in FIG. 11C, the XY scanner 109 is simultaneously moved in both the X-axis and Y-axis directions with respect to an image capturing range 192 where the retina 127 is present. Then, the measuring beam 106 is raster-scanned along a trajectory 193 on the image capturing range 192. In this state, if the intensity of the return beams 108 is detected, a two-dimensional distribution of the intensity of the return beams 108 can be obtained. Accordingly, a planar image 177 (see FIG. 11D) is acquired.

Figure 11D:
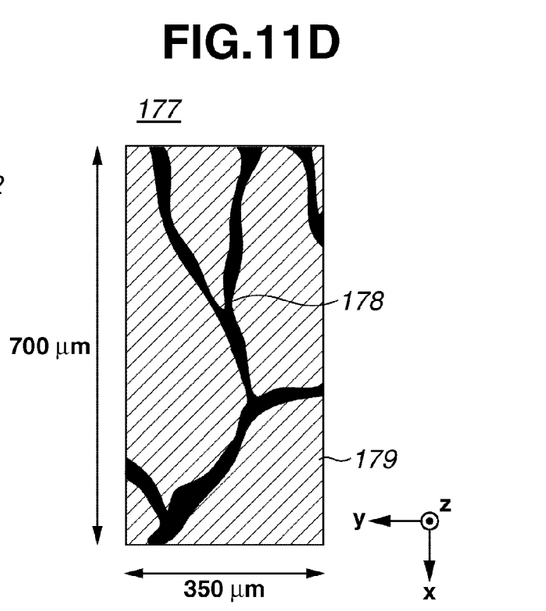

In FIG. 11D, the measuring beam 106 is scanned from a point S at the upper right to a point E at the bottom left. While the scanning is performed, the intensity of the return beams 108 is used in forming the planar image 177. The trajectory 193 from the point E to the point S is the movement of the measuring beam 106 as a preparation for the imaging of the planar image 177 which is to be formed next. The time required for the scanning takes 84% for the point S to the point E and 16% for the point E to the point S with respect to the trajectory 193 in FIG. 11C. This ratio is based on the duty ratio of the drive waveform of the Y scanner described above. Further, in FIG. 11C, for the sake of simplicity, the number of times of scanning in the X direction with respect to the trajectory 193 is smaller than the actual number of times. The planar image 177 has a size of 700×350 μm. The time required for the acquisition is approximately 15.6 ms. This time is based on the drive frequency of the Y scanner.

In the planar image 177, a photoreceptor cell group 179, where the intensity of the return beam 108 is relatively high, is light colored, whereas the blood vessel 178, where the intensity is relatively low, is dark colored. Further, blood cells (not illustrated) are light colored in the blood vessel 178. If the planar image 177 is continuously acquired, the movement of the blood cells through the blood vessel 178 can be visualized. Further, spatio-temporal images may be generated by extracting the blood vessel 178, from which the blood cells are visualized, from the planar images 177 which are continuously acquired, and superimposing the extracted planar images 177 in the order they have been captured.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-204654 filed Sep. 20, 2011, which is hereby incorporated by reference herein in its entirety.

What is claimed is:

1. An image processing apparatus for processing an image of photoreceptor cells of a fundus of an eye, the image processing apparatus comprising:
   at least one memory; and
   at least one processor configured to control;
   a conversion unit configured to convert the image of photoreceptor cells into an image indicating periodicity of the photoreceptor cells; and
   an acquisition unit configured to acquire intensity information from the image indicating the periodicity by using intensities of pixels across a first direction of the image indicating the periodicity and intensities of pixels across a second direction of the image indicating periodicity, the first direction and the second direction intersecting with each other.

2. The image processing apparatus according to claim 1, wherein the acquisition unit is configured to acquire intensity distribution in the plurality of directions of the image indicating the periodicity as the intensity information in the plurality of directions.

3. The image processing apparatus according to claim 1, wherein the acquisition unit is configured to acquire a value indicating distortion of a ring structure of the image indicating the periodicity as the intensity information in the plurality of directions.

4. The image processing apparatus according to claim 3, wherein the value indicating the distortion is obtained from an integrated value in a predetermined direction of the image indicating the periodicity and an integrated value in a direction perpendicular to the predetermined direction.

5. The image processing apparatus according to claim 1, further comprising a display control unit configured to display a display form showing the intensity information in the plurality of directions on a display unit.

6. The image processing apparatus according to claim 5, wherein the display control unit is configured to cause the display unit to display the display form showing the intensity information in the plurality of directions and at least one of the image of photoreceptor cells and the image indicating the periodicity in association with each of the plurality of directions.

7. The image processing apparatus according to claim 1, wherein the conversion unit is configured to convert a plurality of images of photoreceptor cells of the fundus of the eye into a plurality of images indicating the periodicity, and
   wherein the acquisition unit is configured to acquire intensity information in the plurality of directions of each of the plurality of images indicating the periodicity.

8. The image processing apparatus according to claim 7, further comprising:
   an image classification unit configured to classify the plurality of images of photoreceptor cells based on the intensity information; and
   an image selection unit configured to select an image of photoreceptor cells based on a result of classification of the plurality of images of photoreceptor cells.

9. The image processing apparatus according to claim 8, further comprising a superimposing unit configured to superimpose the selected image of photoreceptor cells,
   wherein the image selection unit is configured to select a reference image and an image of photoreceptor cells to be superimposed on the reference image.

10. The image processing apparatus according to claim 1, wherein the conversion unit is configured to acquire a frequency image obtained by frequency conversion of the image of photoreceptor cells as the image indicating the periodicity.

11. An image processing method for processing an image of photoreceptor cells of a fundus of an eye, the method comprising:
   converting the image of photoreceptor cells into an image indicating periodicity of the photoreceptor cells; and
   acquiring intensity information from the image indicating the periodicity by using intensities of pixels across a first direction of the image indicating the periodicity and intensities of pixels across a second direction of the image indicating periodicity, the first direction and the second direction intersecting with each other.

12. The image processing method according to claim 11, further comprising acquiring intensity distribution in the plurality of directions of the image indicating the periodicity as the intensity information in the plurality of directions.

13. The image processing method according to claim 11, further comprising acquiring a value indicating distortion of a ring structure of the image indicating the periodicity as the intensity information in the plurality of directions.

14. A non-transitory computer-readable storage medium storing computer-executable instructions for causing a computer to execute the image processing method according to claim 11.

15. An image processing apparatus for processing an image of photoreceptor cells of a fundus of an eye, the image processing apparatus comprising:
   at least one memory; and
   at least one processor configured to control:
   a conversion unit configured to convert the image of photoreceptor cells into an image indicating periodicity of the photoreceptor cells; and
   an extraction unit configured to extract, based on distortion of a ring structure of the image indicating the periodicity, a feature amount from the image indicating the periodicity.

16. An image processing method for processing an image of photoreceptor cells of a fundus of an eye, the method comprising:
   converting the image of photoreceptor cells into an image indicating periodicity of the photoreceptor cells; and
   extracting, based on distortion of a ring structure of the image indicating the periodicity, a feature amount from the image indicating the periodicity.

17. A non-transitory computer-readable storage medium storing computer-executable instructions for causing a computer to execute the image processing method according to claim 16.

18. The image processing apparatus according to claim 1, further comprising an image acquisition unit configured to acquire an image of photoreceptor cells obtained by capturing an image of photoreceptor cells of the fundus by an adaptive optics scanning laser ophthalmoscope (SLO) communicably connected to the image processing apparatus.

19. The image processing apparatus according to claim 1, further comprising an image acquisition unit configured to acquire an image of photoreceptor cells stored in a database from the database connected to the image processing apparatus via a network.

* * * * *